United States Patent
Hong

(10) Patent No.: US 12,292,584 B2
(45) Date of Patent: May 6, 2025

(54) ELECTRONIC DEVICE, DISPLAY DEVICE AND DRIVING METHOD THEREOF

(71) Applicant: BOE TECHNOLOGY GROUP CO., LTD., Beijing (CN)

(72) Inventor: Tao Hong, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 859 days.

(21) Appl. No.: 17/422,456

(22) PCT Filed: Feb. 24, 2020

(86) PCT No.: PCT/CN2020/076464
§ 371 (c)(1),
(2) Date: Jul. 13, 2021

(87) PCT Pub. No.: WO2021/168621
PCT Pub. Date: Sep. 2, 2021

(65) Prior Publication Data
US 2022/0342232 A1    Oct. 27, 2022

(51) Int. Cl.
*G02F 1/01* (2006.01)
*G02B 1/00* (2006.01)
*G02B 30/56* (2020.01)

(52) U.S. Cl.
CPC ............ *G02B 30/56* (2020.01); *G02B 1/002* (2013.01)

(58) Field of Classification Search
CPC .................................. G02B 26/06; G02F 1/01
See application file for complete search history.

(56) References Cited

U.S. PATENT DOCUMENTS

| | | |
|---|---|---|
| 5,311,337 A | 5/1994 | McCartney, Jr. |
| 8,400,480 B2 | 3/2013 | Kim et al. |
| 10,281,731 B2 | 5/2019 | Srivastava et al. |

(Continued)

FOREIGN PATENT DOCUMENTS

| | | |
|---|---|---|
| CN | 103886808 A | 6/2014 |
| CN | 103903524 A | 7/2014 |

(Continued)

OTHER PUBLICATIONS

Office action from Chinese Application No. 201911042575.9 dated Aug. 11, 2021.

(Continued)

*Primary Examiner* — Joseph P Martinez
(74) *Attorney, Agent, or Firm* — Calfee, Halter & Griswold LLP

(57) ABSTRACT

The present disclosure relates to an electronic device, a display device, and a driving method for the display device, and relates to the field of display technology. The display device includes a display panel, a polarization conversion layer, and a lens layer. The display panel is used to display multiple depth-of-field images in a time-division way during a frame. The polarization conversion layer is arranged on the light exit side of the display panel, and is used to convert light for different depth-of-field images into polarized light of different polarization states. The lens layer is arranged on the side of the polarization conversion layer away from the display panel, and includes a plurality of lens units, each lens unit including a metasurface lens.

12 Claims, 4 Drawing Sheets

(56) References Cited

U.S. PATENT DOCUMENTS

| | | |
|---|---|---|
| 10,356,397 B2 | 7/2019 | Zhou et al. |
| 2008/0117154 A1 | 5/2008 | Yeh |
| 2008/0252558 A1 | 10/2008 | Kim et al. |
| 2015/0331247 A1 | 11/2015 | Srivastava et al. |
| 2016/0241843 A1 | 8/2016 | Zhou et al. |
| 2020/0169719 A1 | 5/2020 | Li et al. |
| 2021/0088782 A1* | 3/2021 | Zhao ............ G02B 27/0172 |

FOREIGN PATENT DOCUMENTS

| | | |
|---|---|---|
| CN | 105807438 A | 7/2016 |
| CN | 105968228 A | 10/2016 |
| CN | 105988228 A | 10/2016 |
| CN | 106531072 A | 3/2017 |
| CN | 106773081 A | 5/2017 |
| CN | 107561723 A | 1/2018 |
| CN | 107783304 A | 3/2018 |
| CN | 107993580 A | 5/2018 |
| CN | 108803031 A | 11/2018 |
| CN | 109212771 A | 1/2019 |
| CN | 106531072 B | 6/2019 |
| CN | 110632767 A | 12/2019 |
| CN | 106773081 B | 1/2020 |
| CN | 107993580 B | 1/2020 |
| CN | 107561723 B | 5/2020 |
| CN | 111624782 A | 9/2020 |
| JP | 2005062626 A | 3/2005 |
| WO | 2019072071 A1 | 4/2019 |

OTHER PUBLICATIONS

Office action from Chinese Application No. 201911042575.9 dated Feb. 2, 2021.
International Search Report from PCT/CN2020/076464 dated Nov. 25, 2020.
Written Opinion from PCT/CN2020/076464 dated Nov. 25, 2020.
International Search Report from PCT/CN2020/115125 dated Dec. 14, 2020.
Written Opinion from PCT/CN2020/115125 dated Dec. 14, 2020.

* cited by examiner

ELECTRONIC DEVICE, DISPLAY DEVICE AND DRIVING METHOD THEREOF

CROSS-REFERENCE TO RELATED APPLICATION

The present application is a 35 U.S.C. 371 national phase application of PCT International Application No. PCT/CN2020/076464 filed on Feb. 24, 2020, the entire disclosure of which is incorporated herein as a part of the present application for all purposes.

TECHNICAL FIELD

The present disclosure relates to the field of display technology, and in particular to an electronic device, a display device, and a driving method for the display device.

BACKGROUND

The integrated imaging technology is a common three-dimensional display technology, which generally uses a microlens array or a microhole array to optically reproduce in space the spatial position of the image in the original scene on the display panel, thereby forming a three-dimensional image. The size of the depth-of-field range is an important indicator of the integrated imaging display, which indicates in how much space a clear three-dimensional image can be displayed. However, the existing display device for integrated imaging has a relatively small depth-of-field range, and the display effect needs to be improved.

It should be noted that the information disclosed in the background section is only used to enhance the understanding of the background of the present disclosure, and therefore may include information that does not constitute prior art known to those of ordinary skill in the art.

SUMMARY

According to an aspect of the present disclosure, there is provided a display device, including:
- a display panel, configured to display multiple depth-of-field images in a time-division way during a frame;
- a polarization conversion layer, arranged on the light exit side of the display panel, and configured to convert light for different depth-of-field images into polarized light of different polarization states; and
- a lens layer, arranged on the side of the polarization conversion layer facing away from the display panel, and including a plurality of lens units, each of which includes a metasurface lens.

In an exemplary embodiment of the present disclosure, the depth-of-field images include a first depth-of-field image and a second depth-of-field image, and the polarization conversion layer is configured to convert light for the first depth-of-field image into a first polarized light, and to convert light for the second depth-of-field image into a second polarized light, wherein the first polarized light and the second polarized light are circularly polarized light with opposite rotation directions.

In an exemplary embodiment of the present disclosure, each of the lens units further includes a microlens, the metasurface lens is located between the microlens and the polarization conversion layer, and the image distances for imaging of the first polarized light and the second polarized light by the lens unit meet the following conditions:

$$l_1 = \frac{\left(\frac{f_a f_b}{f_a + f_b - d}\right) \times \left(\frac{f_a f_b}{f_a + f_b - d} - \frac{f_b(f_b - d)}{f_a + f_b - d} + D\right)}{\frac{f_b(f_b - d)}{f_a + f_b - d} + D};$$

$$l_2 = \frac{\left(\frac{-f_a f_b}{f_a - f_b - d}\right) \times \left(\frac{-f_a f_b}{f_a - f_b - d} - \frac{-f_b(-f_b - d)}{f_a - f_b - d} + D\right)}{\frac{-f_b(-f_b - d)}{f_a - f_b - d} - D},$$

where, $l_1$ is the image distance for imaging of the first polarized light by the lens unit, and $l_2$ is the image distance for imaging the second polarized light by the lens unit; where, $f_a$ is the focal length of the microlens, $f_b$ is the focal length of the metasurface lens with respect to the first polarized light, and $-f_b$ is the focal length of the metasurface lens with respect to the second polarized light; and where, d is the distance between the microlens and the metasurface lens, and D is the distance between the display panel and the metasurface lens.

In an exemplary embodiment of the present disclosure, the display panel includes a plurality of sub-pixels, and the depth-of-field ranges for imaging of the first polarized light and the second polarized light by the lens unit meet the following conditions:

$$\Delta z_1 = 2l_1 \times \frac{P_x}{P_{MLA}};$$

$$\Delta z_2 = 2l_2 \times \frac{P_x}{P_{MLA}},$$

where, $\Delta Z_1$ is the depth-of-field range for imaging of the first polarized light by the lens unit, $\Delta Z_2$ is the depth range for imaging of the second polarized light the lens unit, $P_X$ is the size of the sub-pixel, and $P_{MLA}$ is the distance between two adjacent lens units.

In an exemplary embodiment of the present disclosure, each lens unit further comprises a microlens, the metasurface lens is located between the microlens and the polarazition conversion layer, and the display panel includes a plurality of pixel islands each corresponding to a respective microlense, wherein each of the pixel islands includes a plurality of sub-pixels arranged in an array, several of the sub-pixels are grouped into a plurality of pixels, and each pixel includes a plurality of sub-pixels with different colors.

In an exemplary embodiment of the present disclosure, the sub-pixels of the same pixel island have the same color, several of the pixel islands are grouped into a plurality of groups of pixel islands, and each group of pixel islands includes a plurality of pixel islands with different colors, in the same group of pixel islands, sub-pixels with the same relative positions of the respective microlenses corresponding to each pixel island constitute a pixel.

In an exemplary embodiment of the present disclosure, each pixel includes three sub-pixels distributed in a triangle.

In an exemplary embodiment of the present disclosure, the lens unit further includes a microlens, the metasurface lens is provided in plural, and each metasurface lens is laminated between the microlens and the polarization conversion laye.

In an exemplary embodiment of the present disclosure, each lens unit further includes a microlens, the metasurface lens is located between the microlens and the polarization conversion layer, a first transparent separation layer is provided between the polarization conversion layer and the metasurface lenses, and a second transparent separation layer is provided between the metasurface lenses and the microlenses.

In an exemplary embodiment of the present disclosure, the display device further includes:

a polarization control circuit, for controlling the polarization conversion layer to convert light for different depth-of-field images into polarized light with different polarization states; and an image rendering circuit, configured to control the display panel to display multiple depth-of-field images in a time-division way during a frame.

In an exemplary embodiment of the present disclosure, the microlens of each lens unit is an integrated structure, and the metasurface lens of each lens unit is an integrated structure.

According to an aspect of the present disclosure, there is provided a driving method for a display device, wherein the display device comprises the display device described in any one of the above embodiments, and the driving method includes:

displaying, by the display panel, a plurality of the depth-of-field images in a time-division way during a frame; and controlling the polarization conversion layer to convert light for different depth-of-field images into polarized light with different polarization states.

According to an aspect of the present disclosure, there is provided an electronic device including the display device described in any one of the above embodiments.

It should be understood that the above general description and the following detailed description are only exemplary and explanatory, and cannot limit the present disclosure.

DESCRIPTION OF DRAWINGS

The drawings herein are incorporated into the specification and constitute a part of the specification, show embodiments in accordance with the present disclosure, and are used together with the specification to explain the principle of the present disclosure. Obviously, the drawings in the following description are only some embodiments of the present disclosure. For those of ordinary skill in the art, other drawings can be obtained based on these drawings without creative work.

DETAILED DESCRIPTION OF EMBODIMENTS

Figure 1:
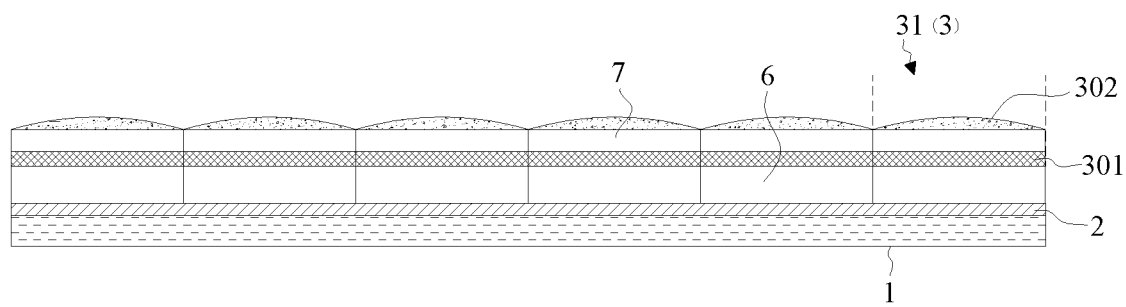
FIG. 1 is a schematic diagram of the display device according to an embodiment of the present disclosure.

Example embodiments will now be described more fully with reference to the accompanying drawings. However, the example embodiments can be implemented in various forms, and should not be construed as being limited to the embodiments set forth herein. On the contrary, these embodiments are provided so that the present disclosure will be comprehensive and complete, and fully convey the concept of the example embodiments to those skilled in the art. The same reference numerals in the figures indicate the same or similar structures, and thus their detailed descriptions will be omitted. In addition, the drawings are only schematic illustrations of the present disclosure, and are not necessarily drawn to scale.

The terms "a", "an", "the" and "said" are used to indicate the presence of one or more elements/components/etc. The terms "include" and "have" are used to indicate open-ended inclusion. It means that in addition to the listed elements/components/etc., there may be other elements/components/etc. The terms "first" and "second" are only used as marks, and are not limited to the number of objects.

Embodiments of the present disclosure propose a display device that can display a three-dimensional image in an integrated imaging manner. As shown in FIG. 1, the display device includes a display panel 1, a polarization conversion layer 2, and a lens layer 3.

The display panel 1 is used to display multiple depth-of-field images in a time-division way during a frame.

The polarization conversion layer 2 is arranged on the light exit side of the display panel 1 and is used to convert light for different depth-of-field images into polarized light of different polarization states.

The lens layer 3 is disposed on the side of the polarization conversion layer 2 facing away from the display panel 1, and the lens layer 3 includes a plurality of lens units 31, wherein each lens unit 31 includes a metasurface lens 301.

In the display device according to embodiments of the present disclosure, the light from the display panel 1 for displaying the depth-of-filed images can be converted into different polarized light by the polarization conversion layer 2. Due to the polarization selectivity of the metasurface lens 301, the lens unit 31 shows focal lengths for the polarized light of different polarization states, so that different central depth planes and depth-of-field ranges can be generated by the lens unit 31. Thus, multiple depth-of-field ranges are superimposed to form the visible range of a three-dimensional image, thereby expanding the visible range of the display device 1. At the same time, the lens unit 31 including the metasurface lens 301 helps to better correct aberrations and improve the display effect of the three-dimensional display.

Hereinafter, each part of the display device according to embodiments of the present disclosure will be described in detail.

As shown in FIG. 1, the display panel 1 may be an Organic Light Emitting Diode (OLED) display panel or a liquid crystal display panel, as long as it can display an image. The display panel 1 can emit light towards one side, wherein the side where the light is emitted is called the light-emitting side, and the side facing away from the light-emitting layer is called the backlight side.

One frame for displaying an image on the display panel 1 can be divided into multiple time periods, and each time period can display one depth-of-field image. That is, multiple depth-of-field images are time-divisionally displayed within one frame. The specific content of the depth-of-field image is not specifically limited here, as long as a three-dimensional image can be generated after light passing through the lens layer 3. For example, one frame can be divided into two time periods, and the number of depth-of-field images is two, including the first depth-of-field image and the second depth-of-field image, wherein each time period displays one depth-of-field image.

Figure 2:
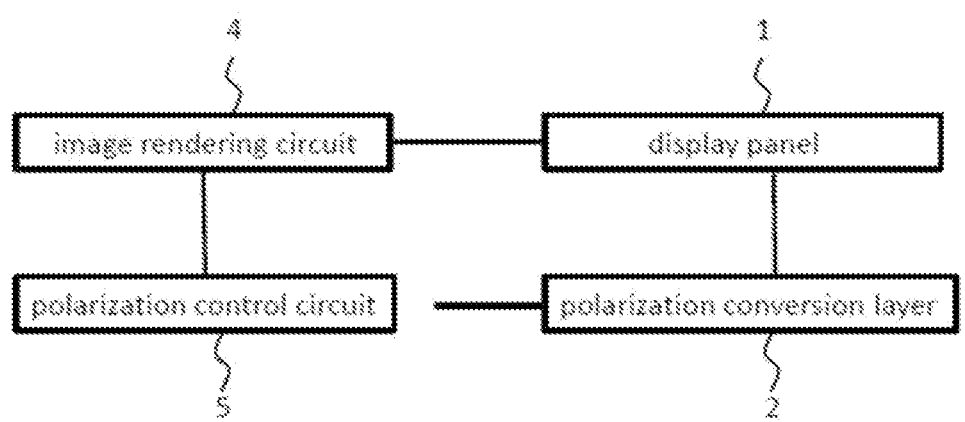
FIG. 2 is a block diagram showing the circuit principle of the display device according to an embodiment of the present disclosure.

In order to control the display panel 1 to display a depth-of-field image, as shown in FIG. 2, in some embodiments of the present disclosure, the display device may further include an image rendering circuit 4, which is connected to the display panel 1 and can control the display panel 1 to time-divisionally display multiple depth-of-field images within one frame.

As shown in FIG. 1, the polarization conversion layer 2 is provided on the light exit side of the display panel 1, and it can convert light for different depth-of-field images into polarized light of different polarization states. The polarization conversion layer 2 may include a liquid crystal phase modulator to convert the polarization state of the light, so as to obtain polarized light with different polarization states. For example, the polarization conversion layer 2 converts the light emitted by the display panel 1 into circularly polarized light with different rotation directions.

In some embodiments of the present disclosure, the depth-of-field images include a first depth-of-field image and a second depth-of-field image, and the polarization conversion layer 2 can convert the light for the first depth-of-field image into a first polarized light, and to convert the light for the second depth-of-field image into a second polarized light, wherein the first polarized light and the second polarized light are circularly polarized light with opposite rotation directions. For example, the first polarized light is a left-handed circularly polarized light, and the second polarized light is a right-handed circularly polarized light.

In some embodiments of the present disclosure, as shown in FIG. 2, the display device may further include a polarization control circuit 5, which can be connected to the polarization conversion layer 2 and control the polarization conversion layer 2 to convert light for different depth-of-field images into polarized light in different polarization states. At the same time, the polarization control circuit 5 can also be connected to the image rendering circuit 4, so as to ensure that the state of the depth-of-field image changes synchronously with the state of the polarization conversion layer 2. For example, when the display panel 1 displays the first depth-of-field image, the polarization conversion layer 2 converts the light for the first depth-of-field image into the first polarized light. When the display panel 1 displays the second depth-of-field image, the polarization conversion layer 2 converts the light for the second depth-of-field image into the second polarized light.

As shown in FIG. 1, the lens layer 3 is provided on the side of the polarization conversion layer 2 facing away from the display panel 1, and the lens layer 3 may include a plurality of lens units 31, wherein the lens units 31 are arranged in an array, and each lens unit 31 includes a metasurface lens 301.

The metasurface lens 301 has the function of polarization selectivity, and exhibits different optical power characteristics for incident light with different polarization states. Therefore, light rays of different polarization states can be formed into different depth-of-field ranges through the metasurface lens 301, and positions of the center depth planes for each depth-of-field range are different. Thus, the depth-of-field ranges superimpose to form the depth-of-field range of the display device, thereby increasing the possible depth-of-field range of the display device and the visual range of the display device.

Figure 3:
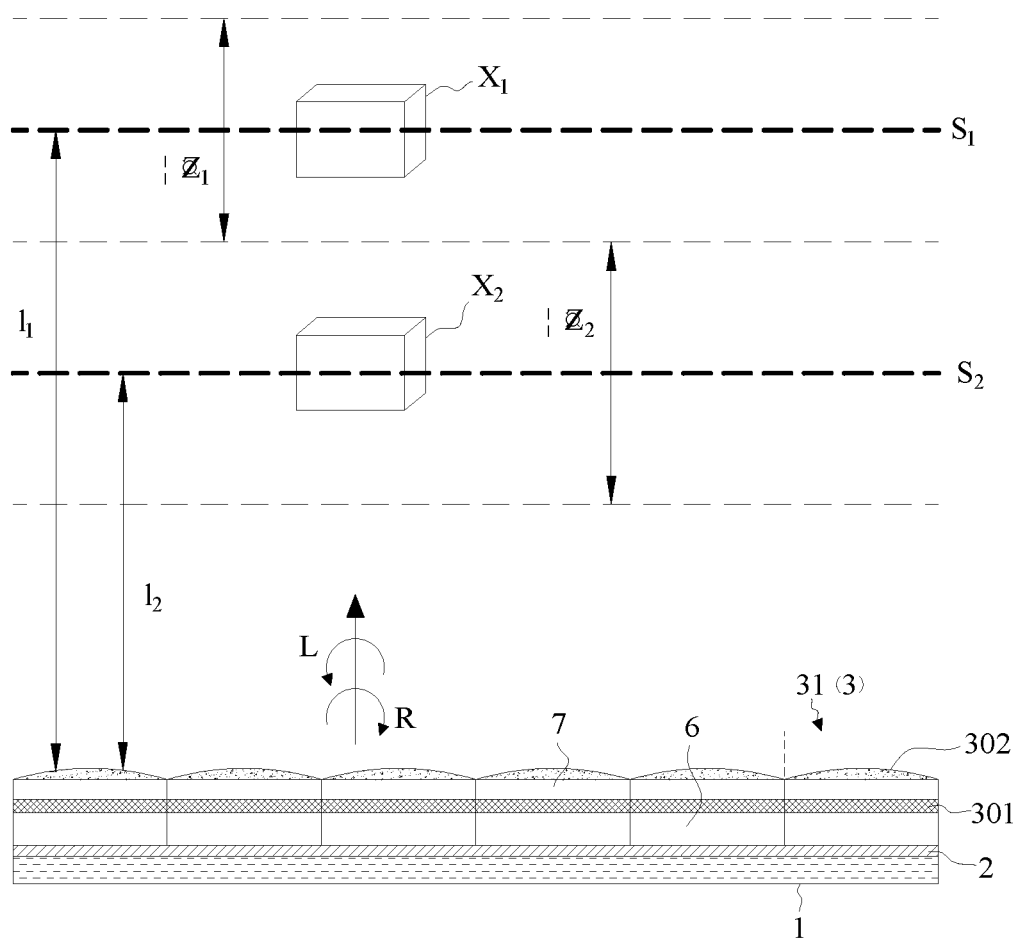
FIG. 3 is an imaging principle diagram of the display device according to an embodiment of the present disclosure.
Figure 4:
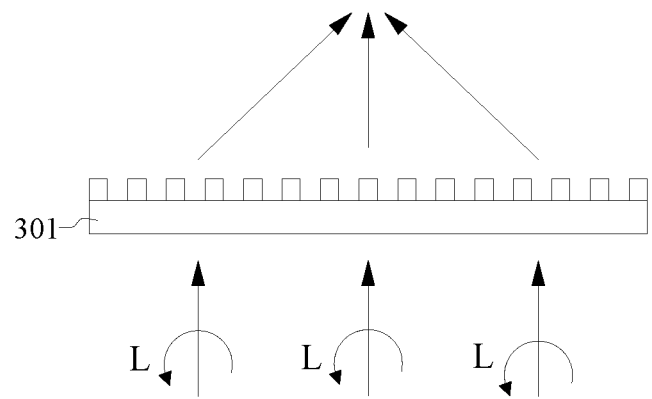
FIG. 4 is a schematic diagram showing the positive refractive power of the metasurface lens in the display device according to an embodiment of the present disclosure.
Figure 5:
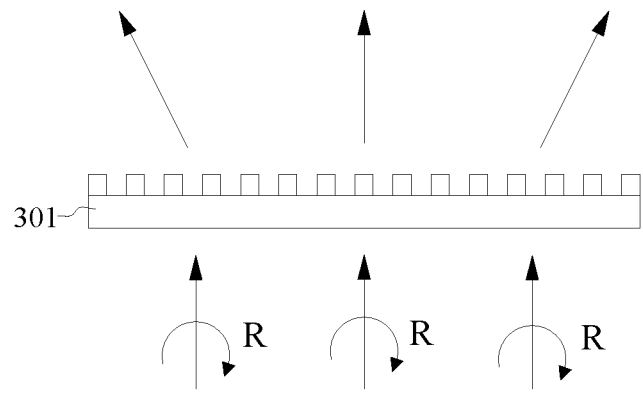
FIG. 5 is a schematic diagram showing the negative refractive power of the metasurface lens in the display device according to an embodiment of the present disclosure.

In some embodiments of the present disclosure, as shown in FIG. 3, the depth-of-field images include a first depth-of-field image and a second depth-of-field image, the first polarized light is a left-handed circularly polarized light (L rotation in FIG. 3), and the second polarized light is a right-handed circularly polarized light R (R rotation in FIG. 3). As shown in FIG. 4, when the left-handed circularly polarized light passes through the metasurface lens 301, the metasurface lens 301 exhibits a positive refractive power. At this time, according to the principle of integrated imaging, the display device forms a three-dimensional image (that is, the first three-dimensional image X1) with the first depth-of-field range $\Delta Z_1$ in a first center depth plane S1. As shown in FIG. 5, when the right-handed circularly polarized light passes through the metasurface lens 301, the metasurface lens 301 exhibits a negative refractive power. At this time, according to the principle of integrated imaging, the display device forms a three-dimensional image with the second depth-of-field range $\Delta Z_2$, that is, the second three-dimensional image X2, on the second central depth plane S2. The first depth-of-field range $\Delta Z_1$ and the second depth-of-field range $\Delta Z_2$ are superimposed to form the depth-of-field range of the display device.

In some embodiments of the present disclosure, as shown in FIG. 3, each lens unit 31 may further include a microlens 302. The metasurface lens 301 is located between the microlens 302 and the polarization conversion layer 2. After the light, for displaying the depth-of-field image by the display panel 1, passes through the metasurface lens 301 and the micro lens 302, a three-dimensional image can be formed. The specific structure of the microlens 101 is not specifically limited here.

The metasurface lens 301 of each lens unit 31 is distributed in an array and is an integrated structure. The microlens 302 of each lens unit 31 is distributed in an array, and is arranged in a one-to-one correspondence with the metasurface lens 301, wherein each metasurface lens 102 is an integrated structure.

Further, as shown in FIG. 1, a first transparent separation layer 6 may be provided between the polarization conversion layer 2 and the metasurface lens 301, and a second transparent separation layer 7 may be provided between the metasurface lens 301 and the microlens 302. The materials of the first separation layer 6 and the second separation layer 7 are not particularly limited here, as long as they are transparent materials.

The number of metasurface lenses 301 of the lens unit 31 is plural, and each metasurface lens 301 of each lens unit 31 is laminated between the microlens 302 and the polarization conversion layer 2. Therefore, the depth-of-field range can be further extended. At the same time, the lens unit 31 formed by the superposition of multiple metasurface lenses 301 and microlenses 302 helps to better correct aberrations, improve the display effect of three-dimensional display, thus for example obtaining better contrast, larger viewing angle, etc.

Figure 6:
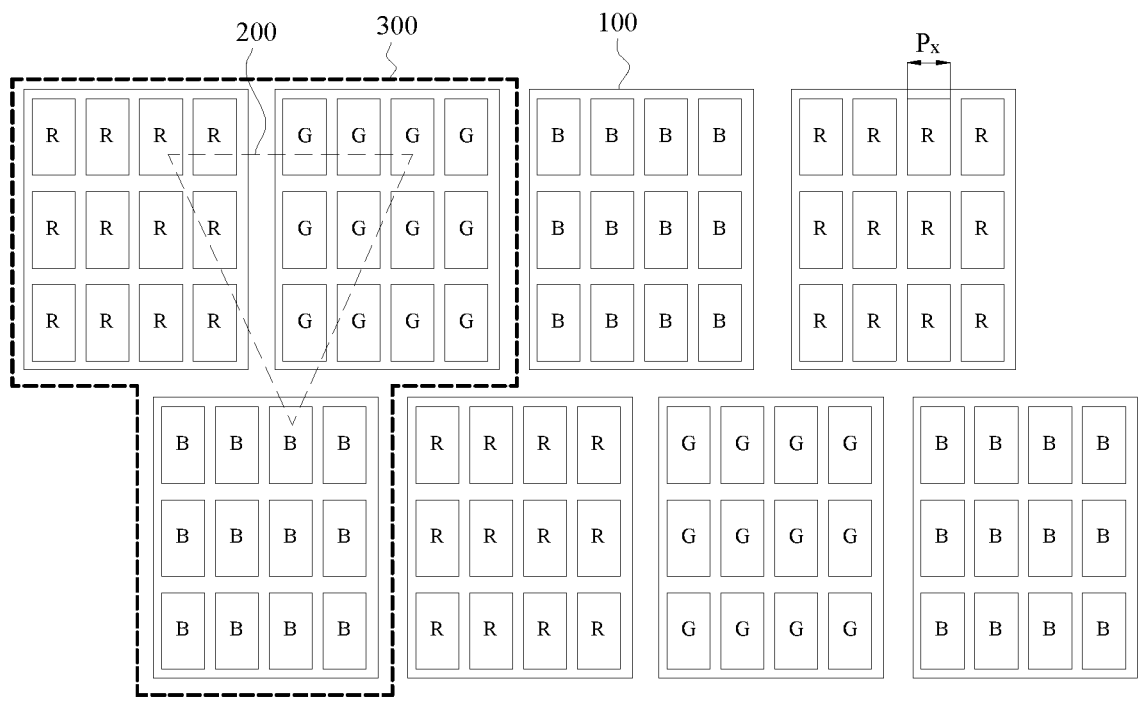
FIG. 6 is a schematic diagram showing the pixel distribution of the display device according to an embodiment of the present disclosure.

In some embodiments of the present disclosure, as shown in FIG. 6, the display panel 1 may include a plurality of pixel islands 100, and each pixel island 100 is arranged in a one-to-one correspondence with a respective microlens 302.

That is, the projection of each pixel island 100 on the lens layer 3 is located in the range of a respective microlens 302 in a one-to-one correspondence, and the light emitted from each pixel island 100 can pass through the corresponding lens layer 3.

Each pixel island 100 includes a plurality of sub-pixels arranged in an array, and several of the plurality of sub-pixels are grouped into a plurality of pixels 200. Each pixel 200 includes a plurality of sub-pixels with different colors. For example, each pixel 200 includes sub-pixels of three different colors. The sub-pixels are red R sub-pixels, green G sub-pixels, and blue B sub-pixels.

Further, the sub-pixels of the same pixel island 100 have the same color, multiple pixel islands 100 are grouped into multiple groups of pixel islands 300, wherein each group of pixel islands 300 includes multiple pixel islands 100 with different colors. For example, each group of pixel islands 300 includes three pixel islands 100, wherein the sub-pixels of one pixel island 100 are all R sub-pixels, the sub-pixels of one pixel island 100 are all G sub-pixels, and the sub-pixels of one pixel island 100 are all B sub-pixels.

As shown in FIG. 6, in the same group of pixel islands 300, sub-pixels with the same relative position of the respective microlens 302 corresponding to each pixel island 100 constitute a pixel 200. That is, in each group of pixel islands 300, the sub-pixels in the nth row and mth column of each pixel island 100 constitute one pixel 200. That is to say, each sub-pixel of a pixel 200 is distributed in a respective pixel island 100 of the same pixel island group 300 in a one-to-one correspondence, and the three sub-pixels are distributed in a triangular shape.

In some embodiments of the present disclosure, as shown in FIG. 3, the depth-of-field images include a first depth-of-field image and a second depth-of-field image, and the image distances for imaging of the first polarized light and the second polarized light by the lens unit 31 meet the following conditions:

$$l_1 = \frac{\left(\frac{f_a f_b}{f_a + f_b - d}\right) \times \left(\frac{f_a f_b}{f_a + f_b - d} - \frac{f_b(f_b - d)}{f_a + f_b - d} + D\right)}{\frac{f_b(f_b - d)}{f_a + f_b - d} + D}; \quad (1)$$

$$l_2 = \frac{\left(\frac{-f_a f_b}{f_a - f_b - d}\right) \times \left(\frac{-f_a f_b}{f_a - f_b - d} - \frac{-f_b(-f_b - d)}{f_a - f_b - d} + D\right)}{\frac{-f_b(-f_b - d)}{f_a - f_b - d} - D}, \quad (2)$$

where, $l_1$ is the image distance for imaging of the first polarized light by the lens unit 31, and $l_2$ is the image distance for imaging of the second polarized light by the lens unit 31;
where, $f_a$ is the focal length of the microlens 302, $f_b$ is the focal length of the metasurface lens 301 with respect to the first polarized light, and $-f_b$ is the focal length of the metasurface lens 301 with respect to the second polarized light; and
where, d is the distance between the microlens 302 and the metasurface lens 301, and D is the distance between the display panel 1 and the metasurface lens 301.

The display panel 1 includes a plurality of sub-pixels, and the depth-of-field ranges for imaging of the first polarized light and the second polarized light by the lens unit 31 meet the following conditions:

$$\Delta z_1 = 2l_1 \times \frac{P_x}{P_{MLA}}; \quad (3)$$

$$\Delta z_2 = 2l_2 \times \frac{P_x}{P_{MLA}}, \quad (4)$$

where, $\Delta Z_1$ is the depth-of-field range for imaging of the first polarized light by the lens unit 31, $\Delta Z_2$ is the depth range for imaging of the second polarized light by the lens unit 31, $P_X$ is the size of the sub-pixel, for example, the sub-pixel is rectangular, and $P_X$ is width of the sub-pixel, and $P_{MLA}$ is the distance between two adjacent lens units 31.

Figure 7:
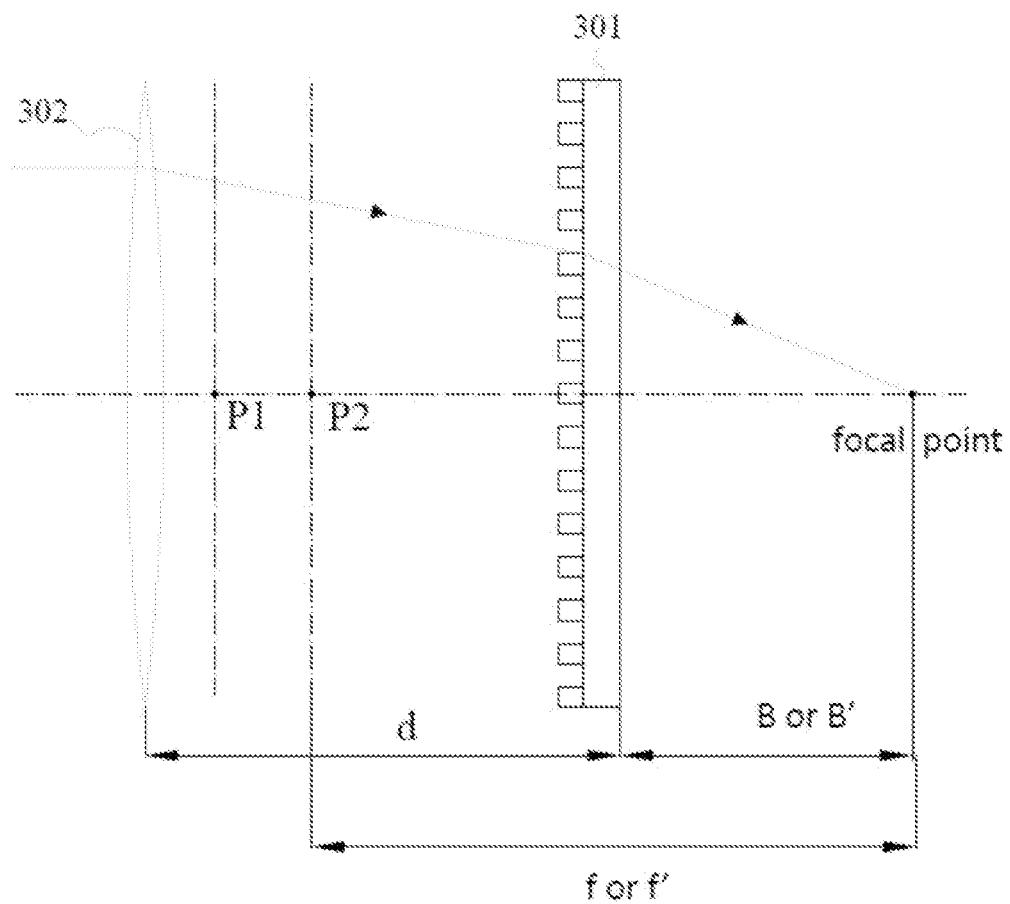
FIG. 7 is a schematic diagram showing the optical path of the lens unit of the display device according to an embodiment of the present disclosure.

Taking the depth-of-field images including the first depth-of-field image and the second depth-of-field image as an example, as shown in FIG. 7, the derivation process of formula (1), formula (2), formula (3) and formula (4) will be explained.

The imaging formula for the lens is:

$$\frac{1}{l} + \frac{1}{l'} = \frac{1}{f} \quad (5)$$

where, f is the focal length of the lens unit 31, and l' is the object distance of the lens unit 31, that is, the object distance of the display panel 1 relative to the lens unit 31.

For the left-handed circularly polarized light, the calculation formula for the focal length f of the lens unit 31 is:

$$f = \frac{f_a f_b}{f_a + f_b - d}. \quad (6)$$

For the right-handed circularly polarized light, the calculation formula for the focal length f' of the lens unit 31 is:

$$f' = \frac{-f_a f_b}{f_a - f_b - d}, \quad (7)$$

where, $f_a$ is the focal length of the microlens 302, $f_b$ is the focal length of the metasurface lens 301 with respect to the first polarized light, $-f_b$ is the focal length of the metasurface lens 301 with respect to the second polarized light, and d is the distance between the microlens 302 and the metasurface lens 301.

For the left-handed polarized light, the back intercept B of the lens unit 31 (that is, the distance between the metasurface lens 301 and the focal point) is obtained by the following formula:

$$B = \frac{f(f_b - d)}{f_a}. \quad (8)$$

For the right-handed polarized light, the back intercept B' of the lens unit 31 (that is, the distance between the metasurface lens 301 and the focal point) is obtained by the following formula:

$$B' = \frac{f'(-f_b - d)}{f_a}. \quad (9)$$

where, $P_1$ is the first principal plane position of the lens unit 31, and $P_2$ is the second principal plane position of the lens unit 31. Assuming that the distance between the display panel 11 and the metasurface lens 301 is D, the object distance for the left-handed polarized light is:

$$l'_1 = f - B + D. \tag{10}$$

For the right-handed polarized light, the object distance is:

$$l'_2 = f - B' + D. \tag{11}$$

The image distance $l_1$ of the lens unit 31 for imaging of the first polarized light is:

$$l_1 = \frac{f \cdot l'_1}{f - l'_1}. \tag{12}$$

The image distance $l_2$ of the lens unit 31 for imaging of the second polarized light is:

$$l_2 = \frac{f \cdot l'_2}{f - l'_2}. \tag{13}$$

According to the above formulas (5) to (13), the above formulas (1) to (4) can be obtained.

Embodiments of the present disclosure also provide a method driving for a display device. The display device may be the display device according to any of the foregoing embodiments, and the structure of the display device will not be repeated here. The driving method includes step S110 and step S120.

In step S110, the display panel displays each depth-of-field image in a time-division way within one frame.

In step S120, the polarization conversion layer is controlled to convert light for different depth-of-field images into polarized light of different polarization states.

For the beneficial effects of the driving method according to embodiments of the present disclosure, reference may be made to the above-mentioned embodiments of the display device, which are not repeated here.

In some embodiments of the present disclosure, one frame can be divided into two time periods, for example, the first time period and the second time period. The time duration of one frame is less than the refresh time of the human eye, and the refresh time of the general human eye can be 1/30 second.

In the first time period, the display panel 1 displays the first depth-of-field image, and the polarization conversion layer 2 converts the light for the first depth-of-field image into the first polarized light (the left-handed circularly polarized light). The first polarized light passes through the lens unit 31 to form the first three-dimensional image with the first depth-of-field range.

In the second time period, the display panel 1 displays the second depth-of-field image, and the polarization conversion layer 2 converts the light for the second depth-of-field image into the second polarized light (the right-handed circularly polarized light). The second polarized light passes through the lens unit 31 and then forms the second three-dimensional image with the second depth-of-field range.

The depth-of-field ranges of the first three-dimensional image and the second three-dimensional image are superimposed to synthesize the three-dimensional image.

It should be noted that although the various steps of the method in the present disclosure are described in a specific order in the drawings, this does not require or imply that these steps must be performed in the specific order, or that all the steps shown must be performed, so as to achieve the desired result. Additionally or alternatively, some steps may be omitted, multiple steps may be combined into one step for execution, and/or one step may be decomposed into multiple steps for execution, etc.

Through the description of the above embodiments, those skilled in the art can easily understand that the example embodiments described here can be implemented by software, or can be implemented by combining software with necessary hardware. Therefore, the technical solution according to embodiments of the present disclosure can be embodied in the form of a software product, which can be stored in a non-volatile storage medium (which can be a CD-ROM, U disk, mobile hard disk, etc.) or on the network, Including several instructions to cause a computing device (which can be a personal computer, a server, a mobile terminal, or a network device, etc.) to execute the method according to embodiments of the present disclosure.

Embodiments of the present disclosure also provide an electronic device, including the display device according to any of the above embodiments, the structure and beneficial effects of which are not described in detail herein. The electronic device can be a mobile phone, a tablet computer, a TV, etc., but is not limited to this, and can also be other electronic devices that can perform three-dimensional display.

Those skilled in the art will easily think of other embodiments of the present disclosure after considering the specification and practicing the invention disclosed herein. The present application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are only regarded as exemplary, and the true scope and spirit of the present disclosure are indicated by the appended claims.

The invention claimed is:

1. A display device, comprising:
   a display panel, configured to display a plurality of depth-of-field images in a time-division way during a frame;
   a polarization conversion layer, arranged on a light exit side of the display panel, and configured to convert light for different depth-of-field images into polarized light of different polarization states; and
   a lens layer, arranged on a side of the polarization conversion layer facing away from the display panel, and comprising a plurality of lens units, each lens unit comprising a metasurface lens,
   wherein each lens unit further comprises a microlens, the metasurface lens is provided in plural, and each metasurface lens is laminated between the microlens and the polarization conversion layer.

2. The display device according to claim 1, wherein
   the depth-of-field images comprises a first depth-of-field image and a second depth-of-field image, and
   the polarization conversion layer is configured to convert light for the first depth-of-field image into a first polarized light and to convert light for the second depth-of-field image into a second polarized light, wherein the first polarized light and the second polarized light are circularly polarized light with opposite rotation directions.

3. The display device according to claim 2, wherein
each lens unit further comprises a microlens,
the metasurface lens is located between the microlens and the polarization conversion layer, and
image distances for imaging of the first polarized light and the second polarized light by the lens unit meet the following conditions:

$$l_1 = \frac{\left(\frac{f_a f_b}{f_a + f_b - d}\right) \times \left(\frac{f_a f_b}{f_a + f_b - d} - \frac{f_b(f_b - d)}{f_a + f_b - d} + D\right)}{\frac{f_b(f_b - d)}{f_a + f_b - d} + D};$$

$$l_2 = \frac{\left(\frac{-f_a f_b}{f_a - f_b - d}\right) \times \left(\frac{-f_a f_b}{f_a - f_b - d} - \frac{-f_b(-f_b - d)}{f_a - f_b - d} + D\right)}{\frac{-f_b(-f_b - d)}{f_a - f_b - d} - D},$$

where, $l_1$ is the image distance for imaging of the first polarized light by the lens unit, and $l_2$ is the image distance for imaging of the second polarized light by the lens unit;
where, $f_a$ is a focal length of the microlens, $f_b$ is a focal length of the metasurface lens with respect to the first polarized light, and $-f_b$ is a focal length of the metasurface lens with respect to the second polarized light; and
where, d is a distance between the microlens and the metasurface lens, and D is a distance between the display panel and the metasurface lens.

4. The display device according to claim 3, wherein
the display panel comprises a plurality of sub-pixels, and
depth-of-field ranges of each lens unit for imaging of the first polarized light and the second polarized light meet the following conditions:

$$\Delta z_1 = 2l_1 \cdot \frac{P_x}{P_{MLA}};$$

$$\Delta z_2 = 2l_2 \cdot \frac{P_x}{P_{MLA}},$$

where, $\Delta Z_1$ is the depth-of-field range of each lens unit for imaging of the first polarized light, $\Delta Z_2$ is the depth-of-field range of each lens unit for imaging of the second polarized light, $P_X$ is a size of each sub-pixel, and $P_{MLA}$ is a distance between two adjacent lens units.

5. The display device according to claim 1, wherein
each lens unit comprises a microlens;
the metasurface lens is located between the microlens and the polarization conversion layer; and
the display panel comprises a plurality of pixel islands each corresponding to a respective microlens, wherein each pixel island comprises a plurality of sub-pixels arranged in an array, several of the sub-pixels are grouped into a plurality of pixels, and each pixel comprises a plurality of sub-pixels with different colors.

6. The display device according to claim 5, wherein
the sub-pixels of the same pixel island have the same color, and
several of the pixel islands are grouped into a plurality of groups of pixel islands, wherein each group of the pixel islands comprises a plurality of pixel islands with different colors, and in the same group of pixel islands, sub-pixels with the same relative positions as respective microlens corresponding to each pixel island constitute a pixel.

7. The display device according to claim 6, wherein each pixel comprises three sub-pixels distributed in a triangle.

8. The display device according to claim 1, wherein
each lens unit further comprises a microlens,
the metasurface lens is located between the microlens and the polarization conversion layer,
a first transparent separation layer is provided between the polarization conversion layer and the metasurface lens; and
a second transparent separation layer is provided between the metasurface lens and the microlens.

9. The display device according to claim 1, further comprising:
a polarization control circuit, configured to control the polarization conversion layer to convert light for different depth-of-field images into polarized light of different polarization states; and
an image rendering circuit, configured to control the display panel to display a plurality of depth-of-field images in a time-division way during a frame.

10. The display device according to claim 5, wherein the microlens of each lens unit is an integrated structure and the metasurface lens of each lens unit is an integrated structure.

11. A driving method for a display device, wherein the display device comprises:
a display panel, configured to display a plurality of depth-of-field images in a time-division way during a frame;
a polarization conversion layer, arranged on a light exit side of the display panel, and configured to convert light for different depth-of-field images into polarized light of different polarization states; and
a lens layer, arranged on a side of the polarization conversion layer facing away from the display panel, and comprising a plurality of lens units, each lens unit comprising a metasurface lens, and
the driving method comprises:
displaying, by the display panel, each depth-of-field image in a time-division way during a frame, and
controlling the polarization conversion layer to convert light for different depth-of-field images into polarized light with different polarization states,
wherein each lens unit further comprises a microlens, the metasurface lens is provided in plural, and each metasurface lens is laminated between the microlens and the polarization conversion layer.

12. An electronic device, comprising a display device, wherein
the display device comprises:
a display panel, configured to display a plurality of depth-of-field images in a time-division way during a frame;
a polarization conversion layer, arranged on a light exit side of the display panel, and configured to convert light for different depth-of-field images into polarized light of different polarization states; and
a lens layer, arranged on a side of the polarization conversion layer facing away from the display panel, and comprising a plurality of lens units, each lens unit comprising a metasurface lens,
wherein each lens unit further comprises a microlens, the metasurface lens is provided in plural, and each metasurface lens is laminated between the microlens and the polarization conversion layer.

\* \* \* \* \*